United States Patent
Na et al.

(10) Patent No.: US 12,375,658 B2
(45) Date of Patent: *Jul. 29, 2025

(54) METHOD OF RESTORATION IN SUBBLOCK UNITS, AND VIDEO DECODING APPARATUS

(71) Applicant: SK TELECOM CO., LTD., Seoul (KR)

(72) Inventors: Tae Young Na, Seoul (KR); Sun Young Lee, Seoul (KR); Kyung Hwan Ko, Seoul (KR); Se Hoon Son, Seoul (KR); Jae Il Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,465

(22) Filed: Feb. 26, 2024

(65) Prior Publication Data

US 2024/0214566 A1 Jun. 27, 2024

Related U.S. Application Data

(63) Continuation of application No. 17/441,504, filed as application No. PCT/KR2020/003856 on Mar. 20, 2020, now Pat. No. 11,956,427.

(30) Foreign Application Priority Data

Mar. 21, 2019 (KR) .......................... 10-2019-0032578
Nov. 8, 2019 (KR) .......................... 10-2019-0142195

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/176* (2014.11); *H04N 19/18* (2014.11); *H04N 19/82* (2014.11)

(58) Field of Classification Search
CPC .............. H04N 19/117; H04N 19/119; H04N 19/122; H04N 19/132; H04N 19/157;
(Continued)

(56) References Cited

U.S. PATENT DOCUMENTS

2011/0142132 A1* 6/2011 Tourapis ................ H04N 19/46
375/E7.243
2013/0003855 A1 1/2013 Park et al.
(Continued)

FOREIGN PATENT DOCUMENTS

CN 102792691 A 11/2012
JP 2016-532377 A 10/2016
(Continued)

OTHER PUBLICATIONS

International Search Report issued on Jun. 24, 2020 for corresponding international application No. PCT/KR2020/003856.
(Continued)

*Primary Examiner* — Maria E Vazquez Colon
(74) *Attorney, Agent, or Firm* — Hauptman Ham, LLP

(57) ABSTRACT

A method is disclosed for reconstructing a current block in units of sub-blocks included in the current block. The method includes: decoding transform coefficients in a transform block of the current block, sub-block information indicating a division form of the sub-blocks and transform type information indicating a transform type applied to the transform block from a bitstream; deriving a residual block of the current block from the transform coefficients on the basis of the transform type indicated by the transform type information and the sub-block information; and filtering
(Continued)

boundaries of the sub-blocks in a reconstructed block of the current block derived on the basis of the residual block.

7 Claims, 19 Drawing Sheets

(51) Int. Cl.
*H04N 19/176* (2014.01)
*H04N 19/18* (2014.01)
*H04N 19/82* (2014.01)

(58) Field of Classification Search
CPC .... H04N 19/176; H04N 19/18; H04N 19/625; H04N 19/70; H04N 19/82
See application file for complete search history.

(56) References Cited

U.S. PATENT DOCUMENTS

| | | |
|---|---|---|
| 2015/0085929 A1 | 5/2015 | Chen et al. |
| 2016/0330455 A1 | 11/2016 | Lin et al. |
| 2018/0014031 A1 | 1/2018 | Mukherjee et al. |
| 2018/0199069 A1* | 7/2018 | Nam ...................... H04N 19/82 |
| 2019/0158872 A1 | 5/2019 | Oh et al. |
| 2019/0313130 A1* | 10/2019 | Zhang .................. H04N 19/593 |
| 2020/0074503 A1 | 3/2020 | Helle et al. |
| 2020/0280737 A1* | 9/2020 | Ikai ........................ H04N 19/12 |
| 2020/0288134 A1 | 9/2020 | Lim et al. |

FOREIGN PATENT DOCUMENTS

| | | |
|---|---|---|
| KR | 10-2014-0074402 A | 6/2014 |
| KR | 10-2016-0058823 A | 5/2016 |
| KR | 10-2018-0015686 A | 2/2018 |
| WO | 2019/027241 A1 | 2/2019 |

OTHER PUBLICATIONS

Written Opinion issued for corresponding International Patent Application No. PCT/2020/003856 on Jun. 24, 2020.

Office Action issued on Jun. 15, 2023, for corresponding Chinese patent application No. 202080037105.8, along with an English translation (14 pages).

* cited by examiner (A)

(B)

(A)

(B)

(C)

|   |   |   |   |
|---|---|---|---|
| 1 | 2 | 3 | 4 |
| 5 | 6 | 7 | 8 |
| 9 | 10 | 11 | 12 |
| 13 | 14 | 15 | 16 |

(A)

|   |   |   |   |
|---|---|---|---|
| 13 | 14 | 15 | 16 |
| 9 | 10 | 11 | 12 |
| 5 | 6 | 7 | 8 |
| 1 | 2 | 3 | 4 |

(B)

|   |   |   |   |
|---|---|---|---|
| 4 | 3 | 2 | 1 |
| 8 | 7 | 6 | 5 |
| 12 | 11 | 10 | 9 |
| 16 | 15 | 14 | 13 |

(C)

|   |   |   |   |
|---|---|---|---|
| 16 | 15 | 14 | 13 |
| 12 | 11 | 10 | 9 |
| 8 | 7 | 6 | 5 |
| 4 | 3 | 2 | 1 |

(D)

|   |   |   |   |
|---|---|---|---|
| 9 | 10 | 11 | 12 |
| 13 | 14 | 15 | 16 |
| 1 | 2 | 3 | 4 |
| 5 | 6 | 7 | 8 |

(E)

|   |   |   |   |
|---|---|---|---|
| 3 | 4 | 1 | 2 |
| 7 | 8 | 5 | 6 |
| 11 | 12 | 9 | 10 |
| 15 | 16 | 13 | 14 |

(F)

|   |   |   |   |
|---|---|---|---|
| 11 | 12 | 9 | 10 |
| 15 | 16 | 13 | 14 |
| 3 | 4 | 1 | 2 |
| 7 | 8 | 5 | 6 |

METHOD OF RESTORATION IN SUBBLOCK UNITS, AND VIDEO DECODING APPARATUS

CROSS-REFERENCE TO RELATED APPLICATION

This present application is a continuation of U.S. patent application Ser. No. 17/441,504, filed on Sep. 21, 2021, which is a national phase of PCT/KR2020/003856, filed on Mar. 20, 2020, which is based on and claims priority to Korean Patent Application No. 10-2019-0032578, filed on Mar. 21, 2019, and Korean Patent Application No. 10-2019-0142195, filed on Nov. 8, 2019, which are incorporated herein by reference in their entirety.

TECHNICAL FIELD

The present invention relates to video encoding and decoding and, more particularly, to a method of sub-block based reconstruction and a video decoding apparatus of which encoding and decoding efficiency is improved by reconstructing a video block in units of sub-blocks.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

The present invention is directed to providing an improved video encoding and decoding technology and, particularly, one aspect of the present invention is related to a technology for increasing encoding and decoding efficiency by performing transformation, rearranging, filtering, etc. in units of sub-blocks.

Technical Solution

According to at least one aspect, the present disclosure provides a method of reconstructing a current block in units of sub-blocks included in the current block. The method includes: decoding transform coefficients in a transform block of the current block, sub-block information indicating a division form of the sub-blocks and transform type information indicating a transform type applied to the transform block from a bitstream; deriving a residual block of the current block from the transform coefficients on the basis of the transform type indicated by the transform type information and the sub-block information; and filtering boundaries of the sub-blocks in a reconstructed block of the current block derived on the basis of the residual block.

According to another aspect, the present disclosure provides a video decoding apparatus for reconstructing a current block in units of sub-blocks included in the current block. The apparatus comprises: a decoder configured to decode transform coefficients in a transform block of the current block, sub-block information indicating a division form of the sub-blocks, and transform type information indicating a transform type applied to the transform block from a bitstream; an inverse transformer configured to derive a residual block of the current block from the transform coefficients on the basis of the transform type indicated by the transform type information and the sub-block information; and a filtering unit configured to filter boundaries of the sub-blocks in a reconstructed block of the current block derived on the basis of the residual block.

Advantageous Effects

As described above, according to an embodiment of the present invention, transformation, quantization, coefficient encoding, etc. are performed in units of sub-blocks, and thereby an improvement in compression performance can be expected.

In addition, according to another embodiment of the present invention, effects of transformation, quantization, coefficient encoding, etc. can be further improved through rearrangement of coefficients.

BRIEF DESCRIPTION OF THE DRAWINGS

FIG. 11 is a set of diagrams illustrating division types of sub-blocks.

DETAILED DESCRIPTION

Figure 1:
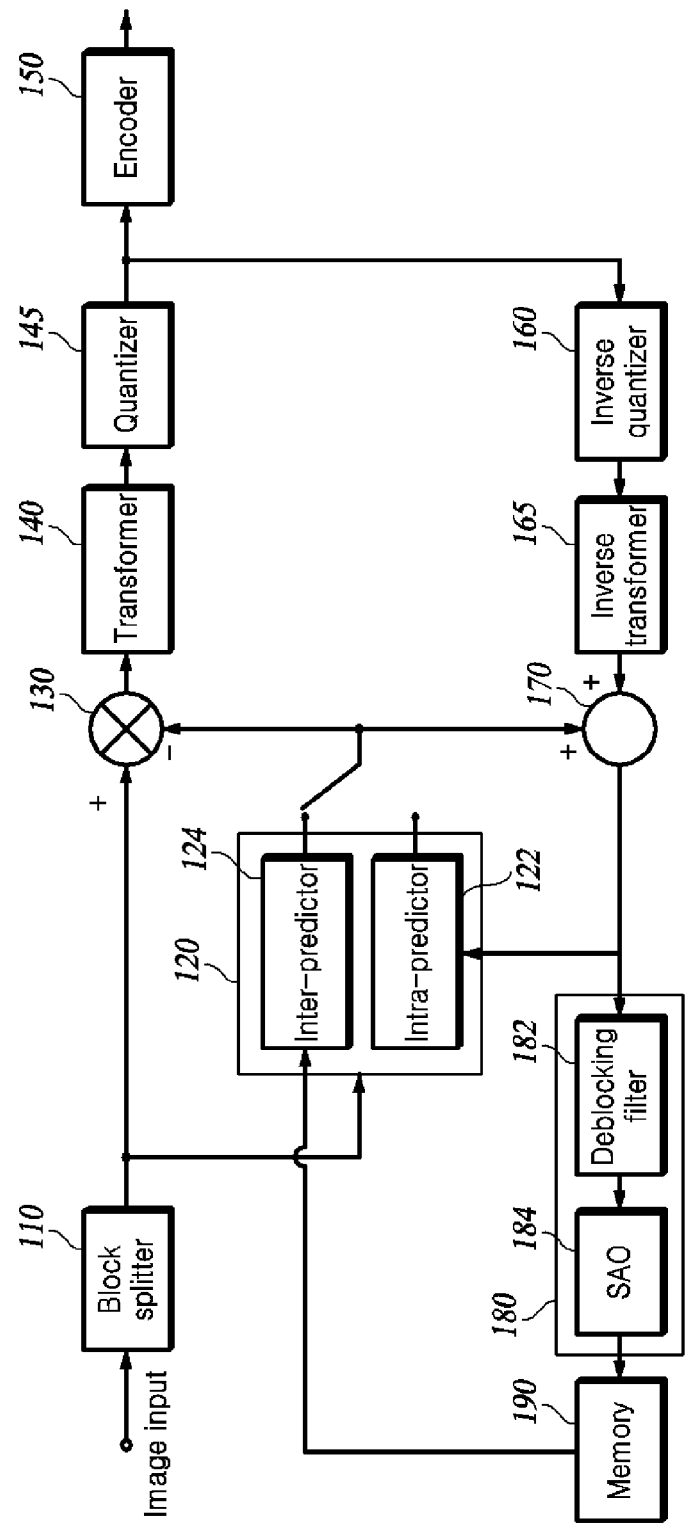
FIG. 1 is an exemplary block diagram of a video encoding apparatus for implementing technologies of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
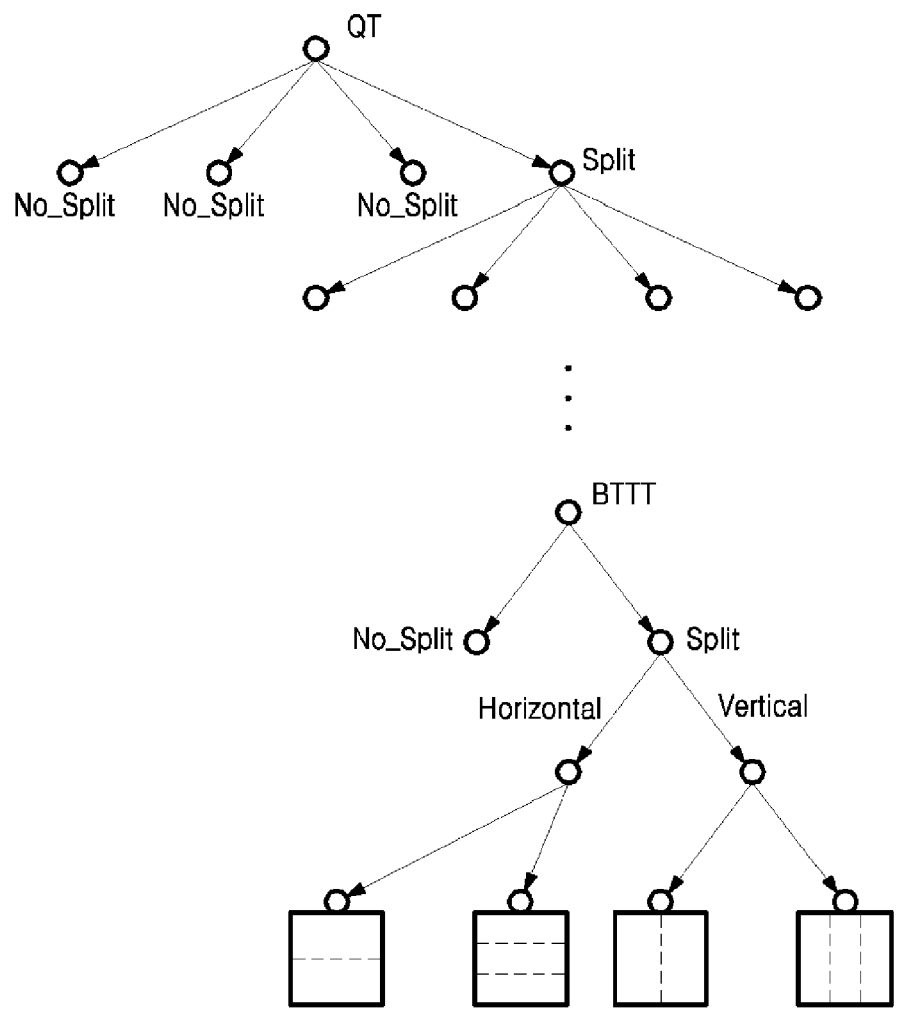
FIG. 2 is a diagram illustrating a method of dividing a block using a QuadTree plus Binary Tree TernaryTree (QTBTTT) structure.

FIG. 2 shows a QTBTTT splitting tree structure. As shown in FIG. 2, a CTU may be initially split in the QT structure. The QT splitting may be repeated until the size of the splitting block reaches the minimum block size (MinQT-Size) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded may be referred to as a 'current block.'

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
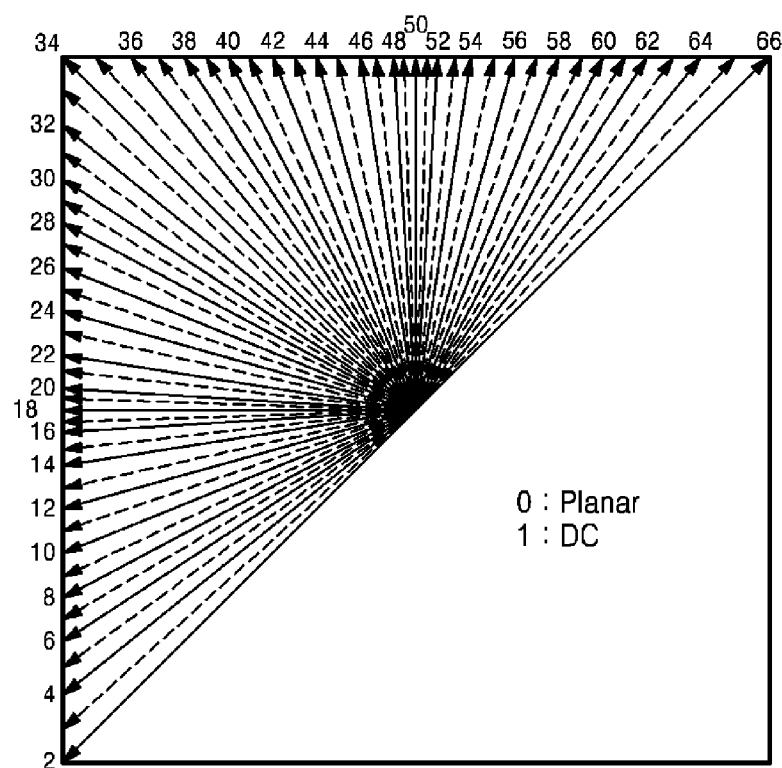
FIG. 3 is a diagram illustrating a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The transformer 140 may select one of a plurality of transform types and transform residual signals. The plurality of transform types may include cosine-based transforms (e.g., discrete cosine transform type II (DCT-II) and DCT VIII) and a sine-based transform (e.g., discrete sine transform type VII (DST-VII). Further, the transformer 140 may skip a transform and output residual signals in the spatial domain to the quantizer 145 without change.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Also, the encoder 150 encodes information on a prediction type which indicates whether a current block is encoded by intra-prediction or inter-prediction and encodes intra-prediction information (i.e., information on an intra-prediction mode) or inter-prediction information (information on a reference picture and a motion vector) according to the prediction type. Further, the encoder 150 may encode transform-related syntax elements. As an example, the encoder 150 may encode a transform skip flag, which indicates whether a transform of residual signals is skipped, transform type information indicating a transform type used to transform the residual signals among a plurality of transform types when the transform of the residual signals is not skipped, and the like.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Although not shown in FIG. 1, the video encoding apparatus may further include a control means for rearranging residual signals (samples) in a residual block. The control means may be implemented together with sub-components shown in FIG. 1 in the same physical component (processor or the like) or implemented in a different physical component than the sub-components shown in FIG. 1. The control means will be described in detail below.

Figure 4:
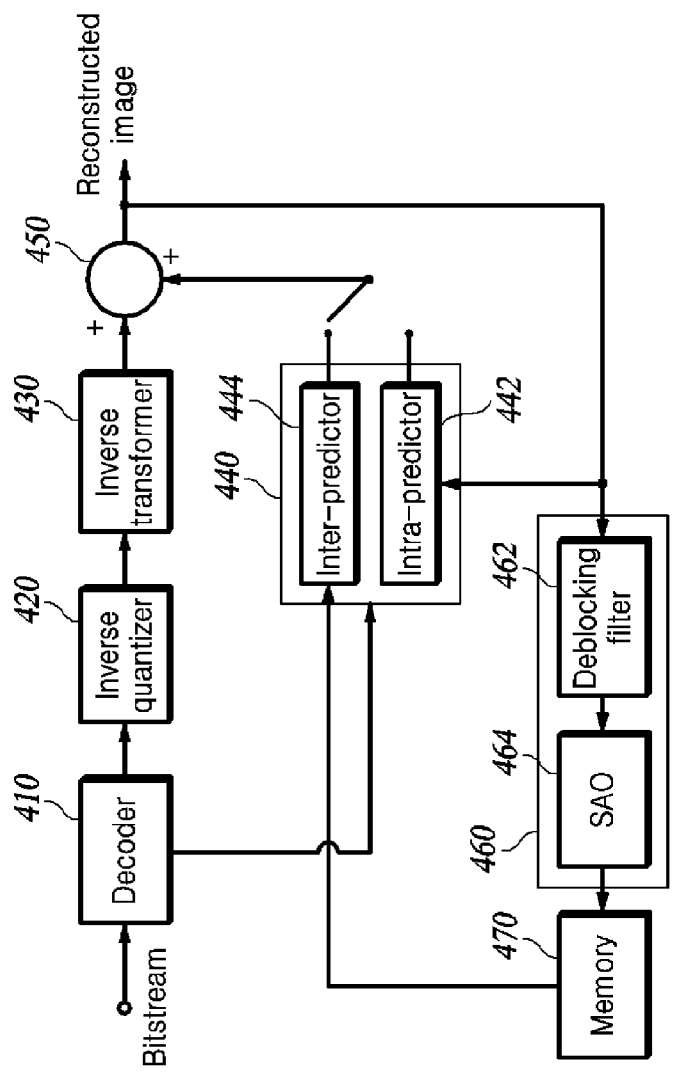
FIG. 4 is an exemplary block diagram of a video decoding apparatus for implementing technologies of the present disclosure.
Figure 5:
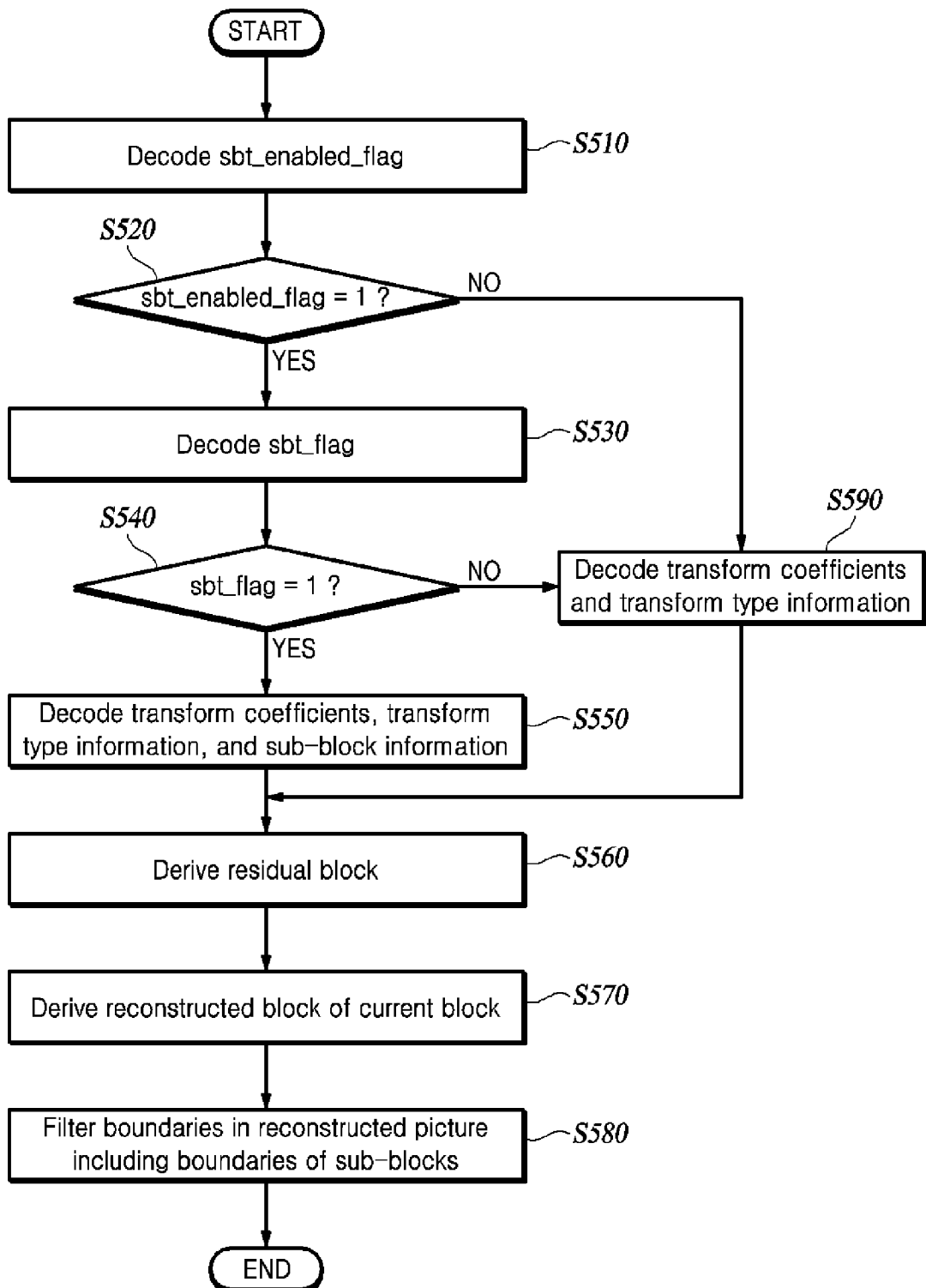
FIG. 5 is a flowchart illustrating a method of reconstruction in sub-block units according to an embodiment of the present invention.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter prediction information, that is, information on a motion vector and information on a reference picture referred to by the motion vector.

Meanwhile, the decoder 410 extracts information on quantized transform coefficients of a current block as information on a residual signal. Also, the decoder 410 extracts transform-related syntax elements. For example, the decoder 410 may extract a transform skip flag and extract transform type information and the like when the transform skip flag indicates that a transform is not skipped. When the transform skip flag indicates transform skip, the decoder 410 extracts information on quantized residual signals of the current block which are not quantized transform coefficients as information on a residual signal.

The inverse quantizer 420 inverse quantizes quantized transform coefficients (or residual signals), and the inverse transformer 430 restores residual signals by inverse transforming the inverse quantized transform coefficients from the frequency domain to the spatial domain and thereby generates a residual block for the current block. The inverse transform may be performed on the basis of the transform-related syntax elements extracted by the decoder 410. For example, when the transform skip flag indicates transform skip, inverse transform by the inverse transformer 430 is skipped. In this case, a block including the inverse quantized residual signals is output as a residual bock. When the transform skip flag indicates that transform is performed, the inverse transformer 430 performs inverse transform according to the transform type indicated by the transform type information. For example, when the transform type indicates DCT-II, the inverse transformer 430 generates a residual block by performing inverse transform using a DCT-II transform matrix, and when the transform type indicates DCT-VII, the inverse transformer 430 generates a residual block by performing inverse transform using a DCT-VII transform matrix.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter predictor 444 determines a motion vector of the current block and a reference picture referenced by the motion vector by using the syntax elements related to the inter prediction information, which are extracted by the decoder 410, and predicts the current block using the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Although not shown in FIG. 4, the video decoding apparatus may further include a control means for rearranging residual signals in a residual block. This control means may be implemented together with sub-components shown in FIG. 4 in the same physical component (processor or the like) or implemented in a different physical component than the sub-components shown in FIG. 4. The control means will be described in detail below.

Meanwhile, the control means included in the video decoding apparatus is a component corresponding to the above-described control means included in the video encoding apparatus in terms of functionality. Hereinafter, to easily distinguish between the control means included in the video decoding apparatus and the control means included in the video encoding apparatus, the control means included in the video decoding apparatus will be referred to as a decoding control means, and the control means included in the video encoding apparatus will be referred to as an encoding control means.

The present invention proposes various methods of reconstructing a current block in units of sub-blocks. The various reconstruction methods may include scanning of transform coefficients, an inverse transform of a sub-block of transform coefficients, sub-block rearrangement of residual samples, boundary filtering of sub-blocks, and the like. Various encoding methods proposed by the present invention may include rearrangement of a sub-block of residual samples, a sub-block transform of a sub-block of residual samples, scanning of transform coefficients, boundary filtering of sub-blocks, and the like.

As used herein, sub-blocks may be units in which scanning, inverse transform/transform, rearranging, filtering, etc. are performed. Sub-blocks may be transform blocks TU or small blocks included in a transform block. As used herein, a current block may be a unit which is separated into, composed of, or divided into a plurality of sub-blocks. Therefore, a current block may correspond to a general unit block on which encoding and decoding is performed or a unit block on which a transform is performed. Division forms of sub-blocks (Transform Sub-block and Non-transform Sub-block)

Figure 6:
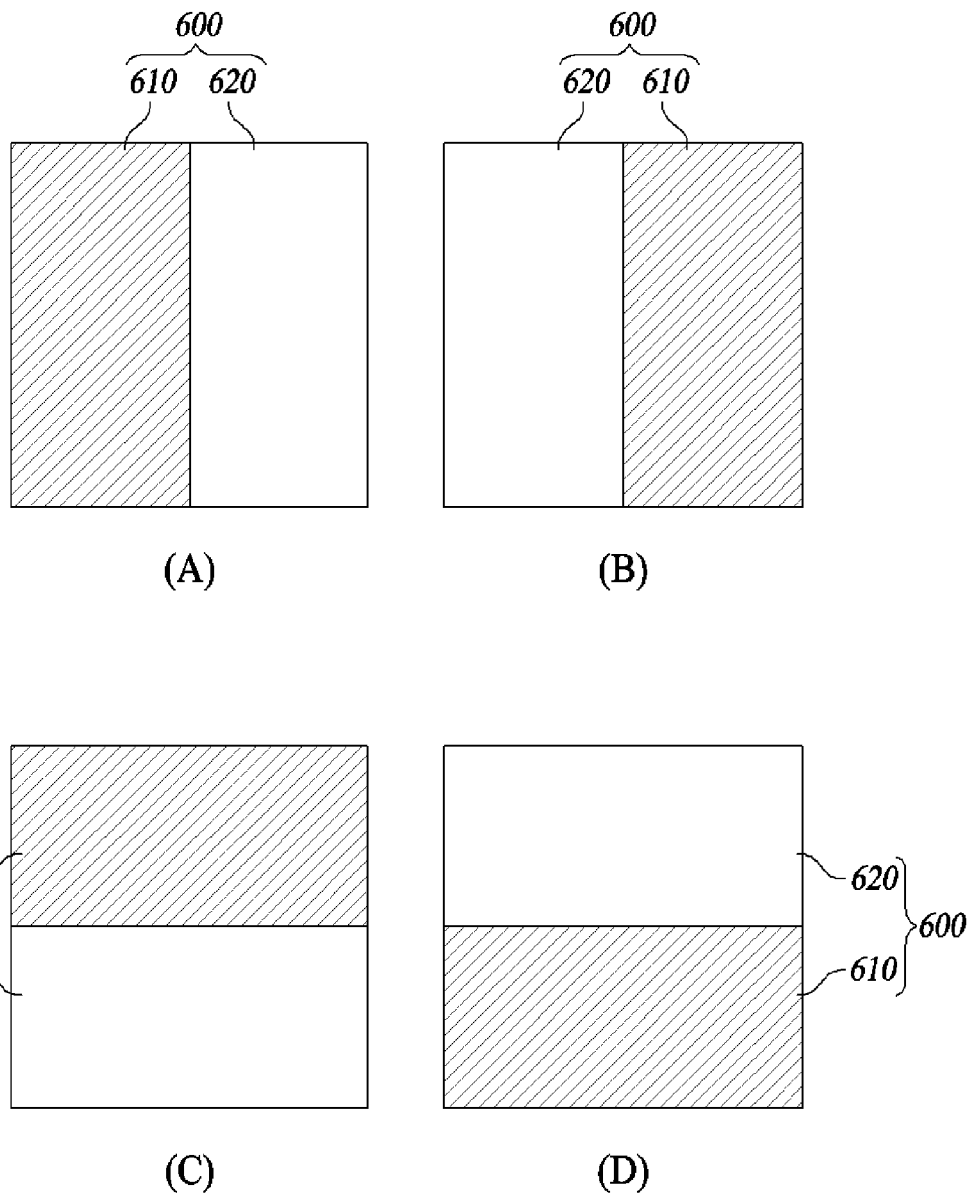
FIGS. 6 to 8 are diagrams illustrating division forms of sub-blocks.
Figure 7:
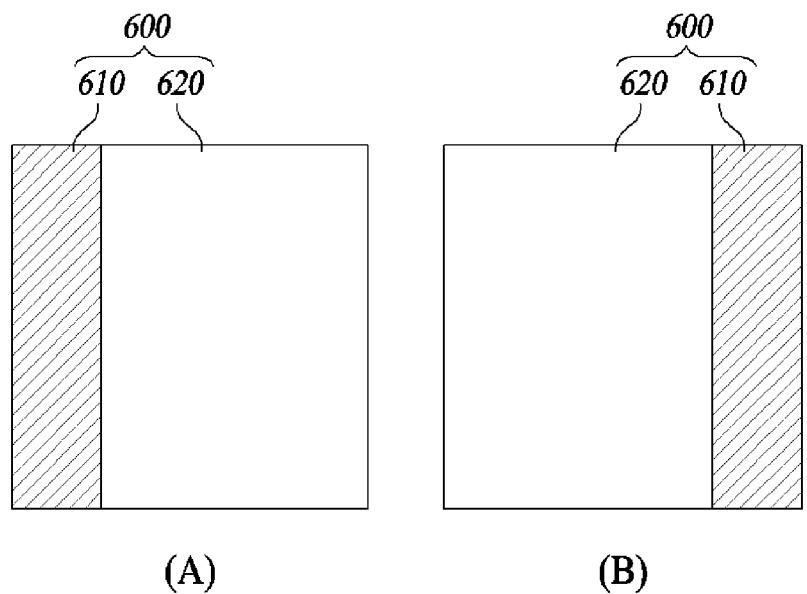
Figure 7:
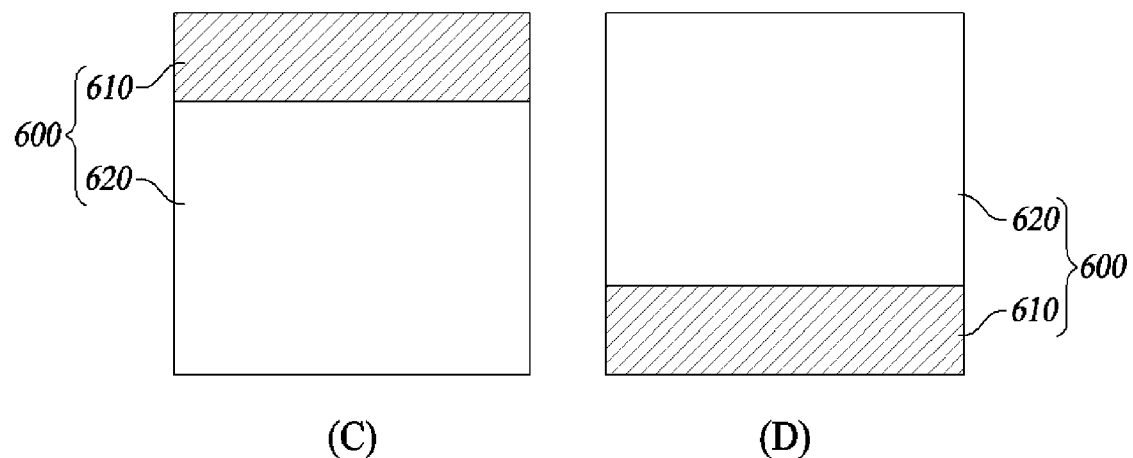
Figure 8:
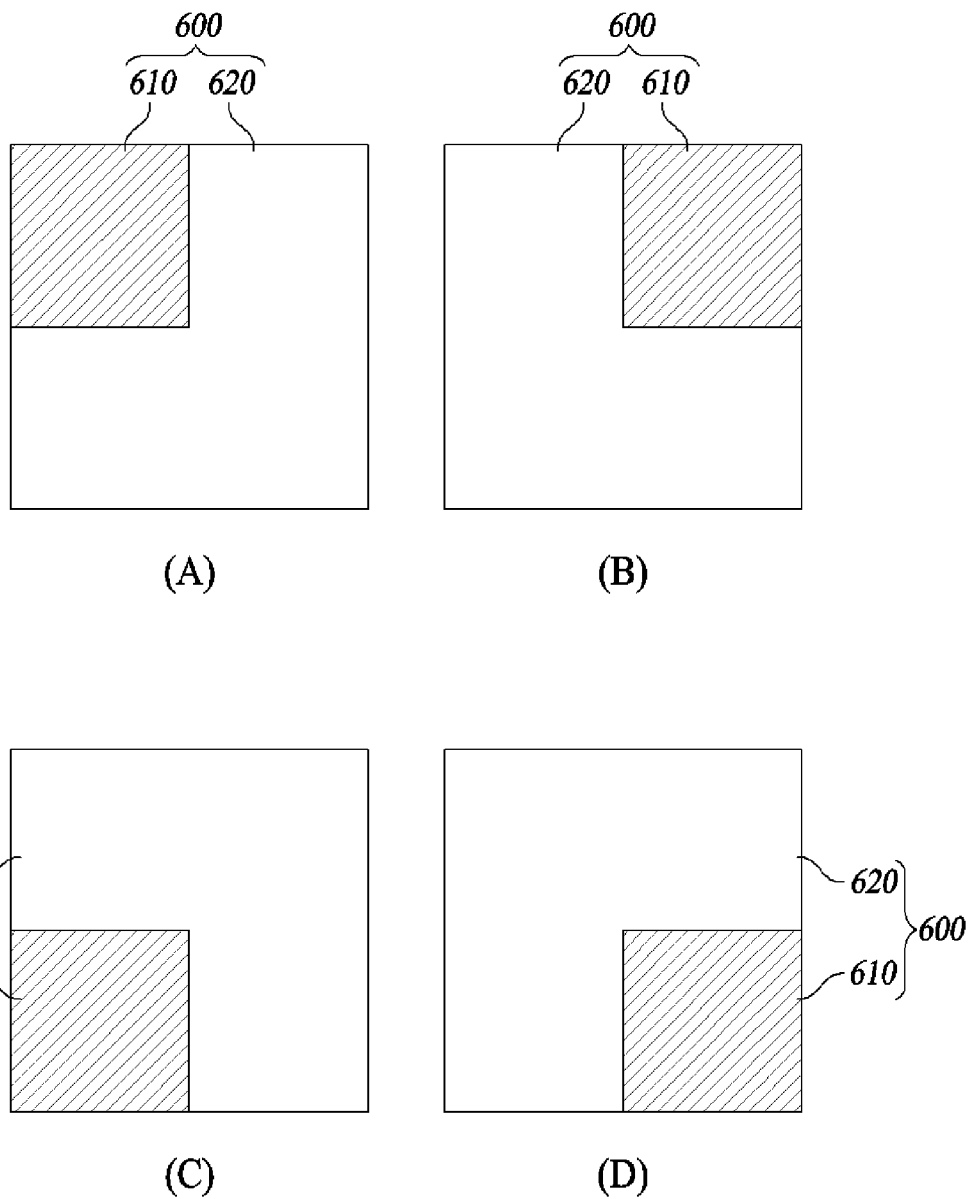

Various examples of division forms (division directions and division types) of sub-blocks are shown in FIGS. 6 to 8. FIG. 6 shows a binary division type in which a current block 600 is separated or divided into sub-blocks 610 and 620 at a ratio of 1:1, and FIGS. 7 and 8 show a quad division type in which the current block 600 is separated or divided into sub-blocks 610 and 620 at a ratio of 1:3.

As shown in FIG. 6, the current block 600 may be divided into the two sub-blocks 610 and 620 having the same size. According to division directions, division forms may be classified into vertical direction division (see (A) and (B) of FIG. 6) and horizontal direction division (see (C) and (D) of FIG. 6).

As shown in FIG. 7, the current block 600 may be divided into the two sub-blocks 610 and 620 at a ratio of 1:3. According to division directions, division forms may be classified into vertical direction division (see (A) and (B) of FIG. 7) and horizontal direction division (see (C) and (D) of FIG. 7).

As shown in FIG. 8, the current block 600 may be divided into the two sub-blocks 610 and 620 at a ratio of 1:3. According to the position of the sub-block 610 having a ratio of 1, division forms may be classified into upper left side division (see (A) of FIG. 8), upper right side division (see (B) of FIG. 8), lower left side division (see (C) of FIG. 8), and lower right side division (see (D) of FIG. 8).

In the sub-block division shown in FIGS. 6 to 8, the hatched region (sub-block) 610 denotes a region in which a value of a residual sample exists and thus transform is performed, and the non-hatched region (sub-block) 620 denotes a region in which a value of a residual sample does not exist or little exists and thus transform is not performed. In this specification, the region in which a transform is performed is referred to as the "transform sub-block 610," and the region in which a transform is not performed is referred to as the "non-transform sub-block 620."

With regard to a direction in which sub-blocks are divided, division direction information indicating a division direction may be implemented as sbt_direction_flag or sbt_horizontal_flag. Among implementation examples of division direction information, "sbt_direction_flag=1" may denote that sub-blocks are divided in a horizontal direction, and "sbt_direction_flag-0" may denote that sub-blocks are divided in a vertical direction. "sbt_horizontal_flag-1" may denote that sub-blocks are divided in the horizontal direction, and "sbt_horizontal_flag-0" may denote that sub-blocks are divided in the vertical direction (not divided in the horizontal direction). The values of sbt_direction_flag and sbt_horizontal_flag may be set for the meanings opposite to the meanings described above.

With regard to a division type of sub-blocks, division type information may correspond to information indicating a division type of the transform sub-block 610 and the non-transform sub-block 620 between the binary division type and the quad division type.

Division type information may be implemented as sbt_binary_flag or sbt_quad_flag. "sbt_binary_flag=1" may denote that the division type of the transform sub-block 610 and the non-transform sub-block 620 corresponds to the binary division type, and "sbt_binary_flag=0" may denote that the division type of the transform sub-block 610 and the non-transform sub-block 620 corresponds to the quad division type (does not correspond to the binary division type). Also, "sbt_quad_flag=1" may denote that a sub-block having a quarter size of the current block 600 is included in the current block 600 (quad division type), and "sbt_quad_flag-0" may denote that a sub-block having a half size of the current block 600 is included in the current block 600 (binary division type).

Sub-Block Transform

A sub-block transform corresponds to a method of transforming only a partial region (transform sub-block) of the current block 600 where non-zero residual sample values are distributed, rather than transforming all transform coefficients in the current block 600.

The video encoding apparatus may signal transform coefficients in a transform block of a current block by including the transform coefficients in a bitstream. When a sub-block transform is performed, signaled transform coefficients may correspond to transform coefficients in the transform sub-block 610. In other words, in this case, transform coefficients in the non-transform sub-block 620 may not be signaled.

The video encoding apparatus may signal transform type information indicating a transform type applied to the transform block by including the transform type information in the bitstream. Further, when a sub-block transform is performed, the video encoding apparatus may signal sub-block information indicating a division form of sub-blocks by including the sub-block information in the bitstream.

The sub-block information may include at least one of division direction information indicating a division direction of sub-blocks (e.g., sbt_direction_flag or sbt_horizontal_flag), division type information indicating a division type of sub-blocks (e.g., sbt_binary_flag or sbt_quad_flag), and position information (e.g., sbt_pos_flag) of the transform sub-block 610 which is a sub-block corresponding to a transform region.

The decoder 410 may decode the transform coefficients, the sub-block information, and the transform type information from the bitstream (S550). When the current block 600 is separated into the transform sub-block 610 and the non-transform sub-block 620, the decoded transform coefficients may consist of only transform coefficients in the transform sub-block 610.

The inverse transformer 430 may derive, on the basis of the transform type indicated by the transform type information and the sub-block information, residual samples (a residual block) from the transform coefficients inversely quantized by the inverse quantizer 420 (S560). Here, the residual block may include a region corresponding to the transform sub-block 610 and a region corresponding to the non-transform sub-block 620.

As an example, the inverse transformer 430 may identify the transform sub-block 610 in the current block 600 (distinguish between the transform sub-block and the non-transform sub-block) using the sub-block information and derive residual samples (a region corresponding to the transform sub-block in the residual block) by applying the transform type to the inverse quantized transform coefficients. Unlike the transform sub-block 610, residual samples in the non-transform sub-block 620 (a region corresponding to the non-transform sub-block in the residual block) may be filled with values of zero. In other words, the region which is not transformed may be treated as having all zero coefficients.

As another example, the entire residual block (the transform sub-block and the non-transform sub-block) is filled with all zero values, and then the region corresponding to the transform sub-block 610 may be filled with the residual samples (residual samples of the transform sub-block) derived from the inverse transformer 430.

Sub-Block Filtering

Meanwhile, as described above, the video encoding apparatus and the video decoding apparatus may derive a reconstructed block of the current block using the residual block and a prediction block of the current block (S570) and filter the derived reconstructed block (a reconstructed picture including the reconstructed block) (S580).

The deblocking filters 180 and 462 filter the boundary between reconstructed blocks to remove a blocking artifact. When a transform is performed in units of sub-blocks according to the present invention, the boundary between sub-blocks may be treated as a block boundary to which filtering will be applied.

In other words, the deblocking filters 180 and 462 may perform filtering by treating the boundary between the transform sub-block 610 and the non-transform sub-block 620 as a boundary to which filtering may be applied. This may represent that, when the sub-blocks correspond to transform blocks, filtering is performed on the boundary between the transform blocks. Also, it may represent that, when the sub-blocks 610 and 620 are small blocks included in a transform block, filtering is performed by treating the boundary between the sub-blocks 610 and 620 as a kind of transform block boundary.

According to some embodiments, whether to perform the method of reconstruction in sub-block units (a sub-block transform) proposed by the present invention may be determined by enable information (e.g., sbt_enabled_flag) and application information (e.g., sbt_flag).

The enable information is information indicating whether a sub-block transform is activated or deactivated (allowed or not allowed). The enable information may be defined in at least one of a sequence-level header, a picture-level header, and a tile group header and signaled from the video encoding apparatus to the video decoding apparatus.

The application information is information indicating whether the sub-block transform is applied and may be included in a bitstream and signaled when the enable information indicates that the sub-block transform is activated. When the sub-blocks 610 and 620 correspond to transform blocks, the application information may be signaled in units of current blocks (e.g., cu_sbt_flag), and when the sub-blocks 610 and 620 correspond to small blocks included in a transform block, the application information may be signaled in units of transform blocks (e.g., tu_sbt_flag).

When the enable information and the application information indicate that a sub-block transform is performed, the video encoding apparatus may signal transform coefficients, transform type information, and sub-block information. Unlike this, when the enable information indicates that the sub-block transform is not allowed or the application information indicates that the sub-block transform is not applied, the video encoding apparatus may only signal transform coefficients and transform type information. In other words, sub-block information may be signaled when a sub-block transform is performed.

First, the decoder 410 may decode enable information from a bitstream (S510). When the enable information indicates that a sub-block transform is activated (S520), the decoder 410 may decode application information (S530). Also, when the application information indicates that the sub-block transform is applied, the decoder 410 may decode transform coefficients, transform type information, and sub-block information (S550). When the enable information indicates that the sub-block transform is not allowed (S520) or the application information indicates that the sub-block transform is not applied (S540), the decoder 410 may not decode sub-block information and may only decode coefficients and transform-type information (S590).

Various embodiments of the present invention for further improving a sub-block transform by rearranging residual samples will be described below.

Figure 9:
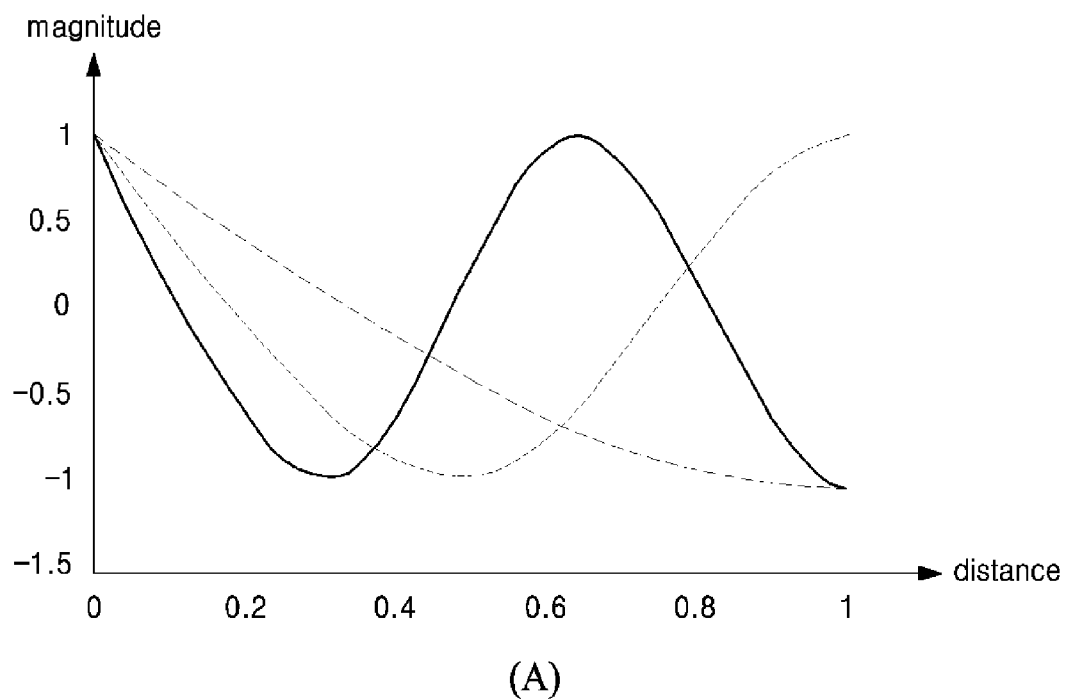
FIG. 9 is a set of diagrams illustrating waveforms of basis functions for transform types.
Figure 9:
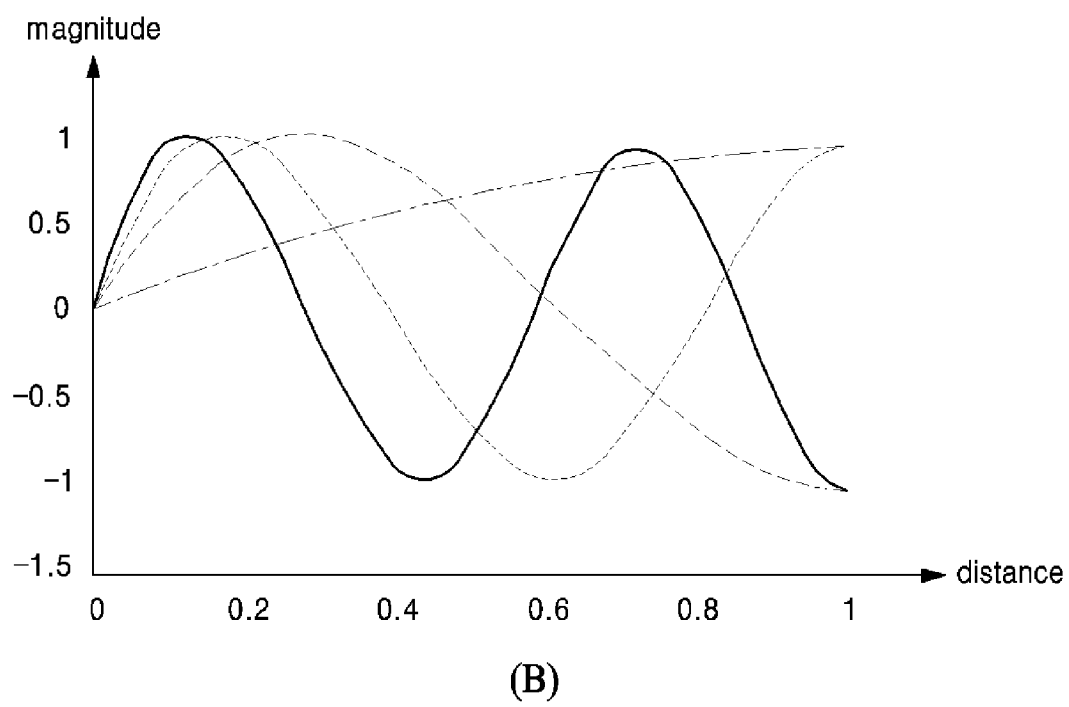

A transform means a process of transforming pixel domain signal values (input signal values) into frequency domain signal values (coefficient signal values). A high efficiency video coding (HEVC) standard performs transform or inverse transform using three types of transform (DCT, DST, and transform skip). In FIG. 9, basis functions for DCT and DST are shown, and the basis functions are obtained by changing the periods of a cosine graph and a sine graph.

In the DCT transform type, the basis functions shown in (A) of FIG. 9 are used to transform the input signal values into the coefficient signal values. In the DST transform type, the basis functions shown in (B) of FIG. 9 are used to transform the input signal values into the coefficient signal values. When input signals to be transformed have a similar shape to the waveform of a basis function, transform may be efficiently processed. In other words, when input signals have a similar shape to the waveform of a basis function, the total of output coefficient signal values is reduced, and thus compression performance can be improved.

In a video encoding standard, input signals to be transformed become residual signals (residual samples) after prediction. Therefore, according to a shape, a form, or a waveform of the residual samples (a shape, a form, or a waveform of residual sample values), a transform type for efficient transform may be selected among the transform types. A detailed example is shown in FIG. 10.

Figure 10:
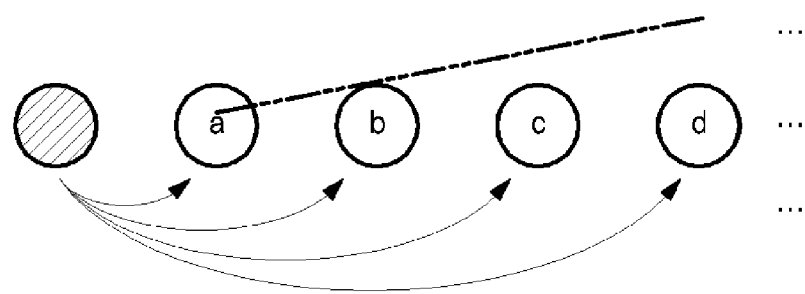
FIG. 10 is a set of diagrams illustrating a transform type appropriate for the energy distribution of residual signals.
Figure 10:
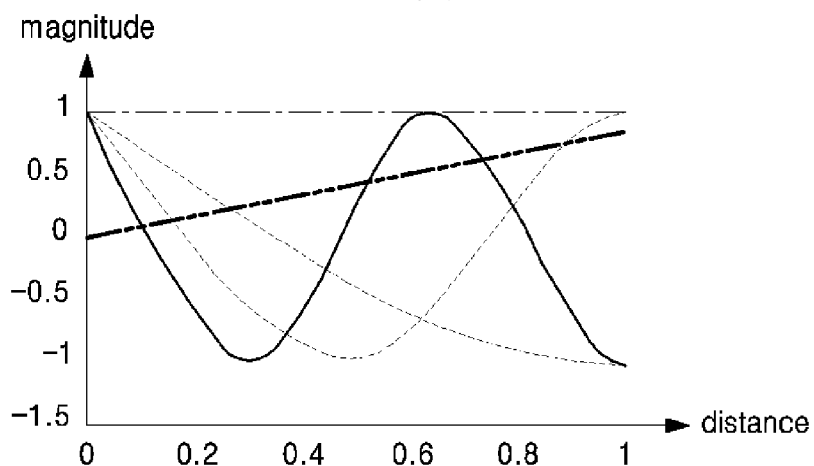
Figure 10:
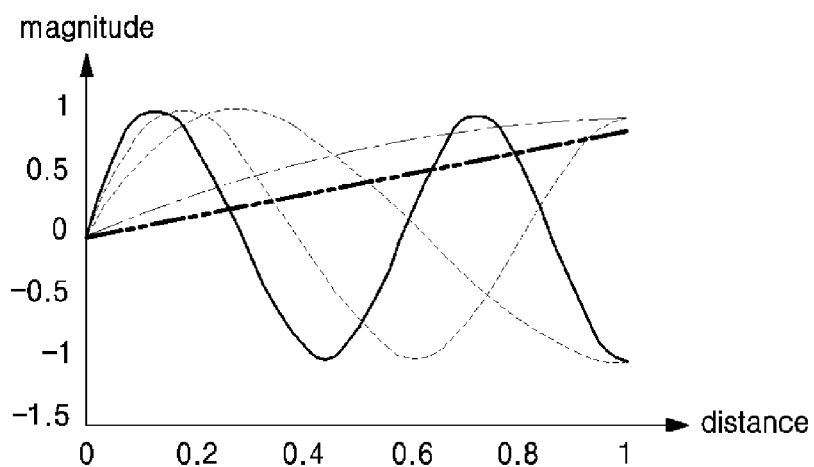
Figure 12:
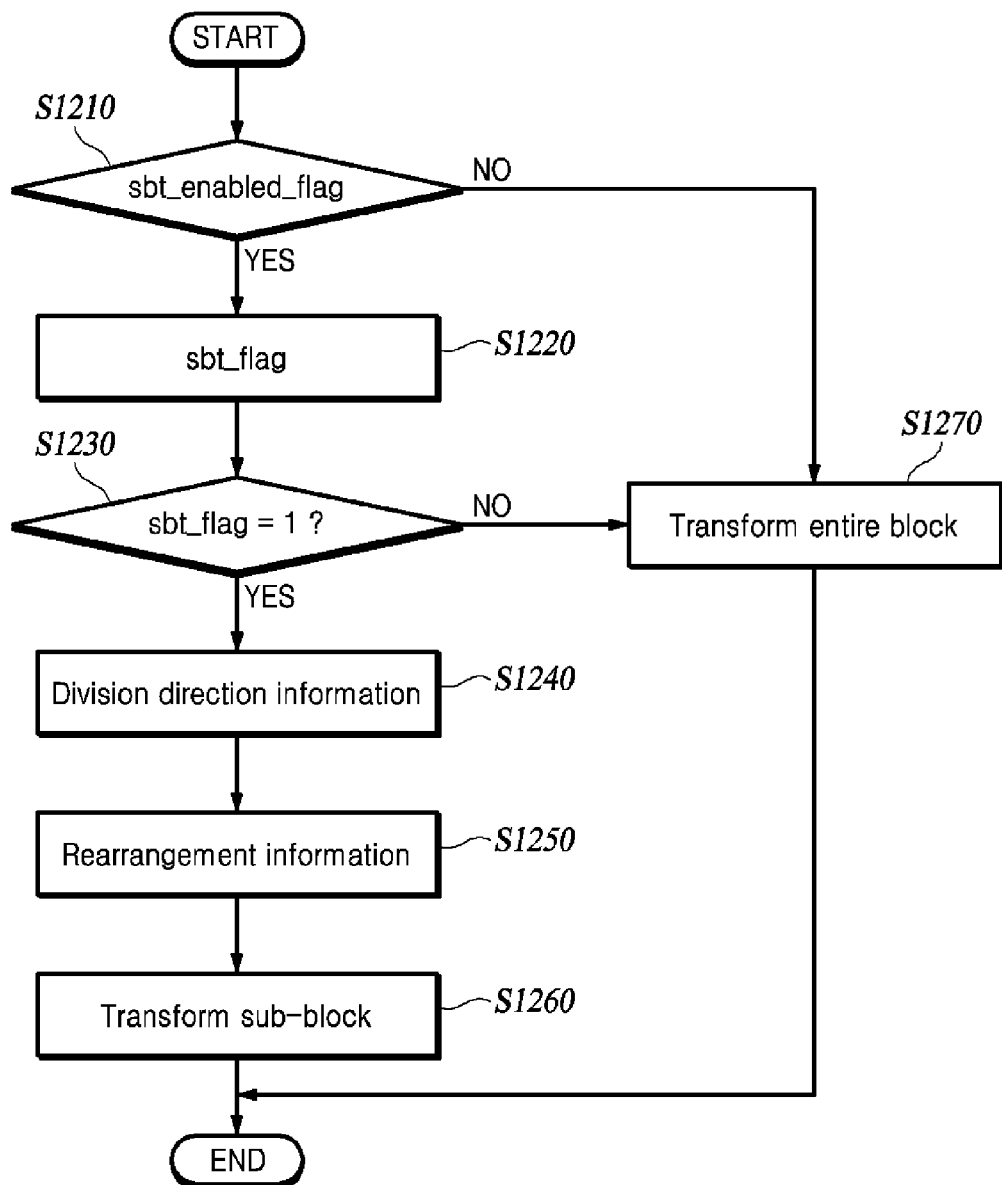
FIGS. 12 to 19 are diagrams illustrating various embodiments of the present invention for rearranging residual samples.
Figure 13:
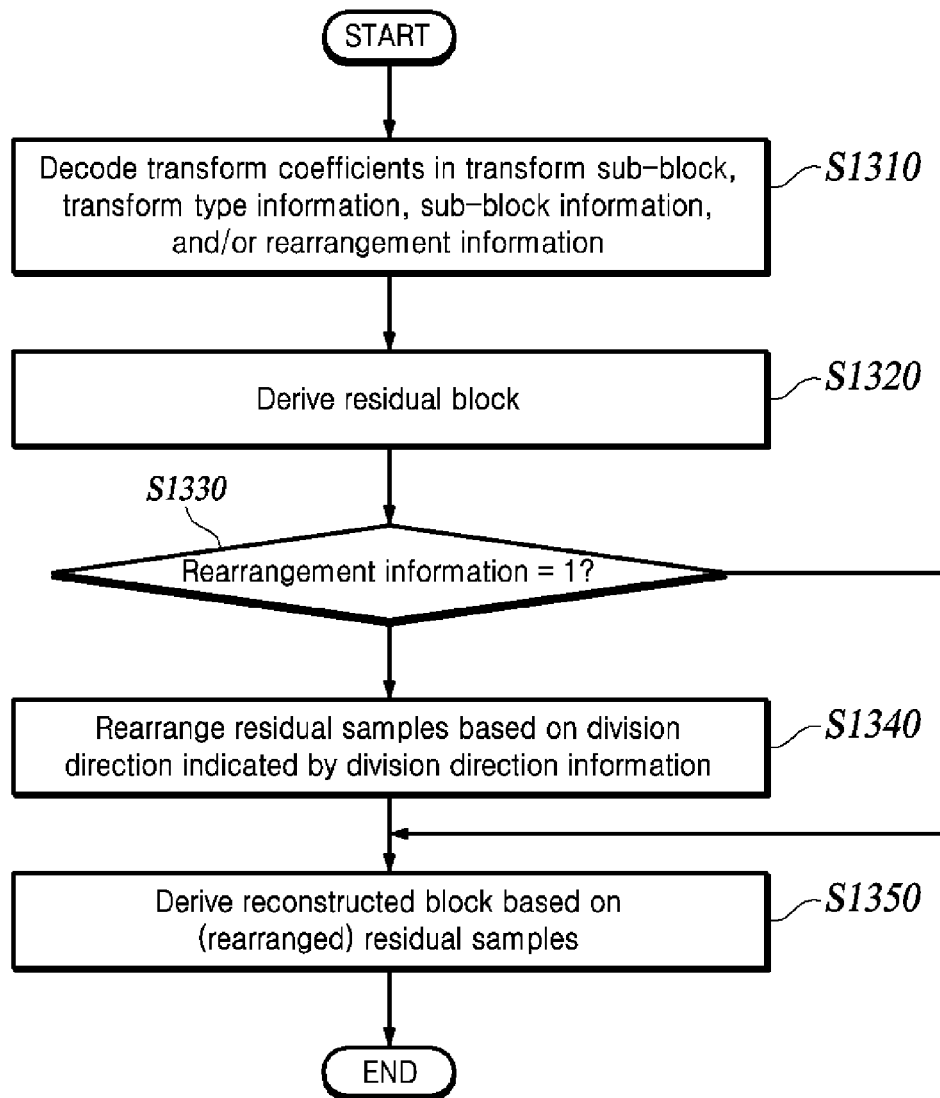
Figure 14:
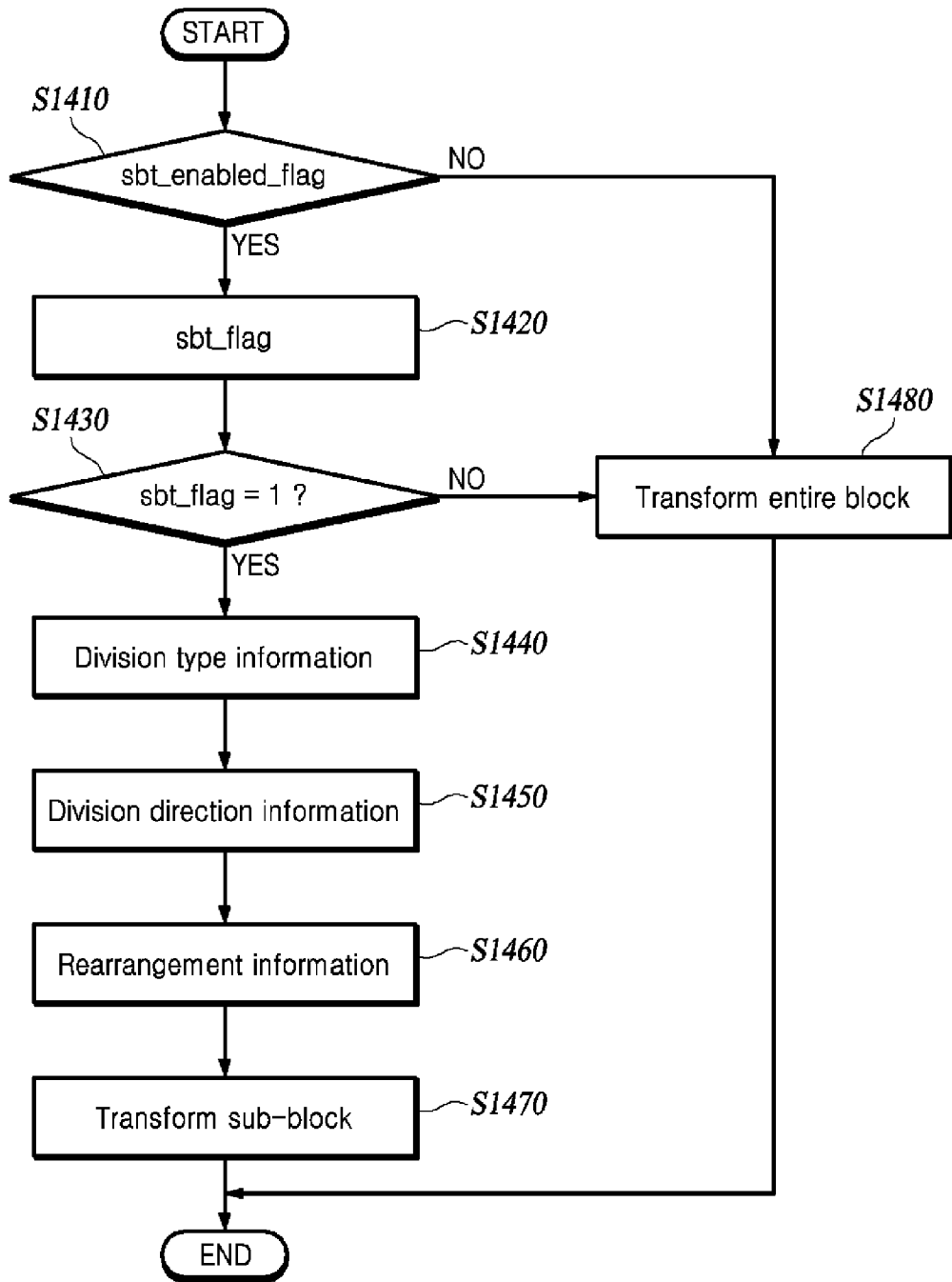
Figure 15:
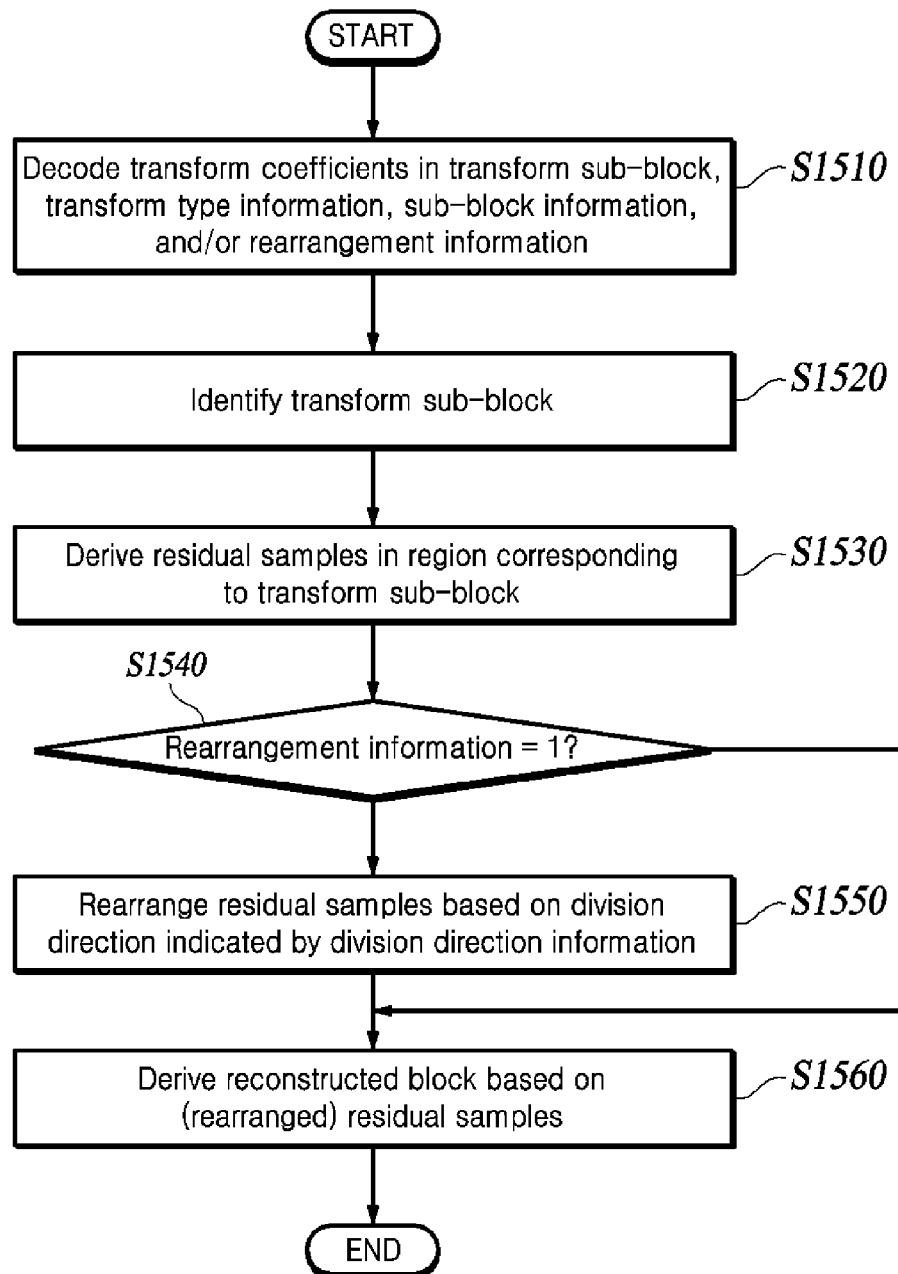
Figure 16:
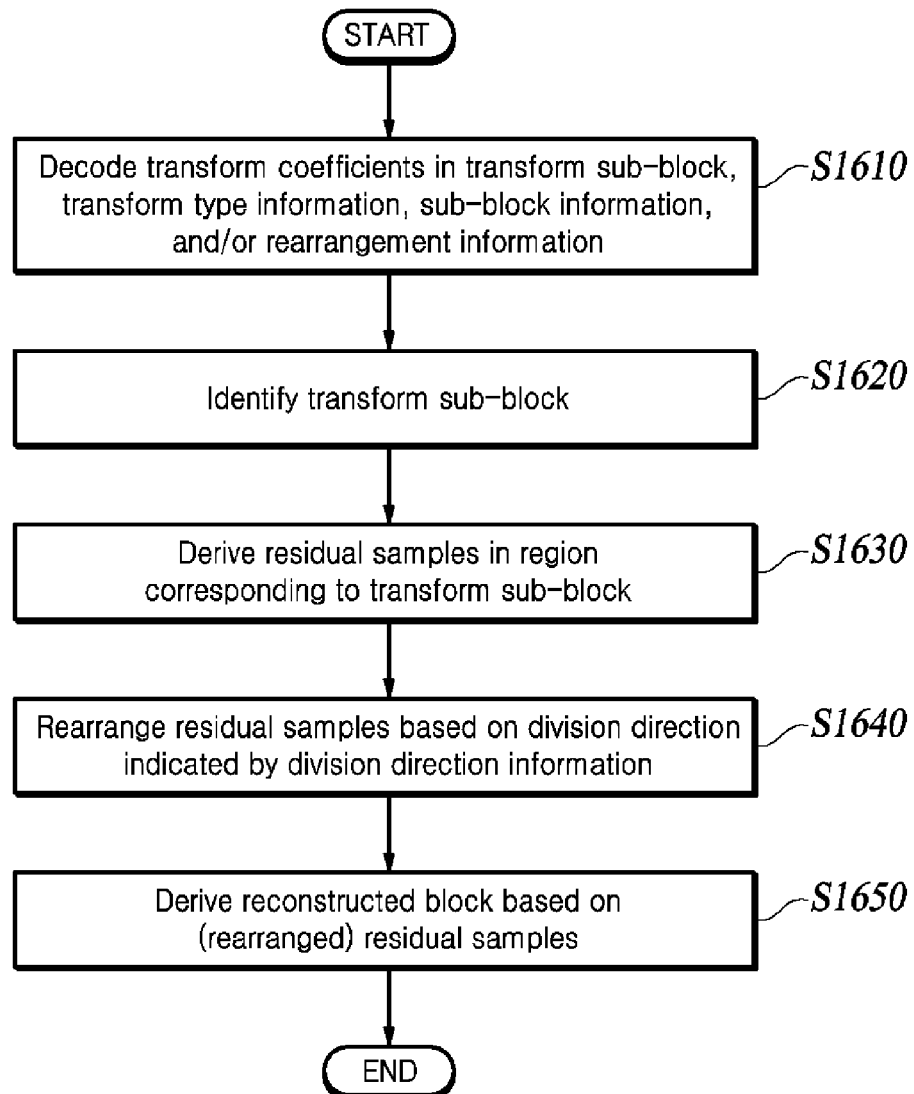

As shown in (A) of FIG. 10, in intra-prediction, difference values (error values) between respective values of pixels a, b, c, and d to be encoded or decoded and a reference sample (a hatched circle) may increase on the basis of the distance from the reference sample. Specifically, when a pixel is closer to the reference sample, prediction accuracy is higher, and thus an error value may be relatively small. When a pixel is farther from the reference sample, prediction accuracy is lower, and thus an error value may be relatively larger. In (A) of FIG. 10, a straight line going toward the upper right as denoted as the two-dot chain line represents an error value magnitude on the basis of the distance from the reference sample An example of comparing the two-dot chain line with the waveforms of DCT basis functions is shown in (B) of FIG. 10, and an example of comparing the two-dot chain line with the waveforms of DST basis functions is shown in (C) of FIG. 10. The two-dot chain line shows an increasing pattern in magnitude as the distance increases. The waveforms of the DCT basis functions show a decreasing pattern in magnitude as the distance increases, and the waveforms of the DST basis functions show an increasing pattern in magnitude as the distance increases. Therefore, it is possible to see that the DST transform type is appropriate for residual sample values which gradually increase.

The transform skip type may be appropriate for a distribution form in which residual sample values is reduced in a direction from the upper left side of the residual block to the lower right side. This is because a conventional method of encoding transform coefficients is appropriate for a case in which many coefficient values are distributed in a low-frequency region and no coefficient value is distributed in a high-frequency region.

The present invention proposes a method of adjusting (or rearranging) the distribution of residual samples having non-zero values in a residual block to the upper left side of the current block 600 and performing transform, quantization, filtering, etc. on the rearranged residual samples. This is intended to maximize effects of a sub-block transform by applying a transform characteristic, in which non-zero coefficients are arranged on the upper left side corresponding to a low-frequency position after a transform, to the sub-block transform.

Rearrangement Method

A method of rearranging residual samples may include a method of flipping or shifting residual samples on the basis of one straight line.

Examples of flipping or shifting residual samples are shown in FIG. 11. (A) of FIG. 11 shows residual samples before rearrangement, (B) to (D) of FIG. 11 show flipped residual samples, and (E) to (G) of FIG. 11 show shifted residual samples. A number shown in each residual sample represents the position of the sample.

The residual samples before rearrangement (see (A) of FIG. 11) may be inverted upside down for rearrangement on the basis of a horizontal axis (a dashed line in the horizontal direction) (H-flip, see (B) of FIG. 11), inverted left and right for rearrangement on the basis of a vertical axis (a dashed line in the vertical direction) (V-flip, see (C) of FIG. 11), and inverted upside down and left and right for rearrangement on the basis of the horizontal axis and the vertical axis (HV-flip, see (D) of FIG. 11). HV-flip may be considered a result of both H-flip and V-flip.

The residual samples before rearrangement (see (A) of FIG. 11) may be shifted up and down for rearrangement on the basis of the horizontal axis (H-shift, see (E) of FIG. 11), shifted left and right for rearrangement on the basis of the vertical axis (V-shift, see (F) of FIG. 11), and shifted up and down and left and right for rearrangement on the basis of the horizontal axis and the vertical axis (HV-shift, see (G) of FIG. 11). HV-shift may be considered a result of both H-shift and V-shift.

The methods of inverting residual samples are represented as Equations 1 to 3 below.

$$r'[x][y] = r[nTbS - x - 1][y] \qquad \text{[Equation 1]}$$

$$r'[x][y] = r[x][nTbS - y - 1] \qquad \text{[Equation 2]}$$

$$r'[x][y] = r[nTbS - x - 1][nTbS - y - 1] \qquad \text{[Equation 3]}$$

Equation 1 represents V-flip, Equation 2 represents H-flip, and Equation 3 represents HV-flip.

For example, the transform sub-block 610 and the non-transform sub-block 620 may be divided as shown in (B) of FIG. 6. In this case, when V-flip or V-shift is applied, coefficients (residual samples) having non-zero values may be rearranged on the left side in the current block 600 as shown in (A) of FIG. 6. Also, the transform sub-block 610 and the non-transform sub-block 620 may be divided as shown in (D) of FIG. 6. In this case, when H-flip or H-shift is applied, the coefficients having the non-zero values may be rearranged on the upper side in the current block 600 as shown in (A) of FIG. 6.

As another example, the transform sub-block 610 and the non-transform sub-block 620 may be divided as shown in (B) of FIG. 8. In this case, when V-flip or V-shift is applied, coefficients having non-zero values may be rearranged on the upper left side in the current block 600 as shown in (A) of FIG. 8. Also, the transform sub-block 610 and the non-transform sub-block 620 may be divided as shown in (C) of FIG. 8. In this case, when H-flip or H-shift is applied, the coefficients having the non-zero values may be rearranged on the upper left side in the current block 600 as shown in (A) of FIG. 8. Further, the transform sub-block 610 and the non-transform sub-block 620 may be divided as shown in (D) of FIG. 8. In this case, when HV-flip or HV-shift is applied, coefficients having non-zero values may be rearranged on the upper left side in the current block 600 as shown in (A) of FIG. 8.

Rearrangement information indicating whether residual samples are rearranged may be implemented as any one of sbt_shifting and sbt_flipping. Among implementation example of rearrangement information, "sbt_shifting=1" may denote that residual samples are shifted (rearranged), and "sbt_shifting-0" may denote that residual samples are not shifted. "sbt_flipping=1" may denote that residual samples are inverted (rearranged), and "sbt_flipping-0" may denote that residual samples are not inverted. The values of sbt_shifting and sbt_flipping may be set to the meanings opposite to those described above.

Embodiment 1

Embodiment 1 corresponds to a rearrangement method which may be applied to any one of the binary division type illustrated in FIG. 6 and the quad division type illustrated in FIG. 7.

The video encoding apparatus may signal enable information and may signal application information (S1220) when the enable information indicates that a sub-block transform is allowed (S1210).

When the application information indicates that the sub-block transform is applied (S1230), the video encoding apparatus may rearrange residual samples and then perform a sub-block transform on the current block 600 (S1260). Transform coefficients may be derived from residual samples in the transform sub-block 610 through a transform process, and residual samples in the non-transform sub-block 620 may be filled with zeros without a transform process. In other words, the residual samples in the non-transform sub-block 620 may be treated as all zero values.

The video encoding apparatus may signal transform coefficients in the transform sub-block 610, transform type information, and division direction information indicating a division direction of sub-blocks (S1240). When the enable information does not indicate that a sub-block transform is allowed (S1210) or the application information indicates that a sub-block transform is not applied (S1230), the video encoding apparatus may perform a transform for the entire current block 600 (S1270). In this case, the division direction information may not be signaled.

The video decoding apparatus may decode the transform coefficients in the transform sub-block 610, the transform type information, and sub-block information (the division direction information) from a bitstream (S1310). Also, the video decoding apparatus may derive residual samples (a residual block) by inversely transforming the transform coefficients according to a transform type indicated by the transform type information (S1320). Here, the residual samples in the transform sub-block 610 may be derived through the inverse transform of the transform coefficients, and residual samples in the non-transform sub-block 620 may be set equal to zero.

The video decoding apparatus may rearrange the residual samples on the basis of the division direction indicated by the division direction information (S1340). Here, the distribution of residual samples which have undergone the rearrangement process may be the same as the distribution of the residual samples before the residual samples are rearranged by the video encoding apparatus. In this case, the video decoding apparatus may derive a reconstructed block on the basis of the rearranged residual samples (S1350).

According to some embodiments, the process S1340 of rearranging the residual samples may be performed as indicated by rearrangement information (e.g., sbt_shifting or sbt_flipping) signaled by the video encoding apparatus.

The video encoding apparatus may further signal rearrangement information indicating whether residual samples have been rearranged (S1250). When the signaled rearrangement information indicates rearrangement (S1330), the video decoding apparatus may rearrange residual samples on the basis of the division direction indicated by the division direction information (S1340). Unlike this, when the rearrangement information indicates that residual samples have not been rearranged (S1330), the video decoding apparatus may derive a reconstructed block on the basis of the derived residual samples without performing the rearrangement process (S1350)

As an example of Embodiment 1, when residual samples having non-zero values are distributed to the right side of the current block 600 as shown in (B) of FIG. 6, enable information and application information may be set to "1," division direction information may be set to "0" which means the vertical direction, and rearrangement information may be set to "1." As a result, residual samples are rearranged such that the residual samples having non-zero values may be rearranged on the left side of the current block 600 as shown in (A) of FIG. 6.

Embodiment 2

Embodiment 2 corresponds to a rearrangement method which may be applied to a case in which both the binary division type and the quad division type are allowed. Compared to Embodiment 1, division type information may be further used in Embodiment 2.

When application information indicates that a sub-block transform is allowed (S1430), the video encoding apparatus may include division type information in sub-block information together with division direction information, and signal the sub-block information to the video decoding apparatus (S1440). Due to the sub-block information, the position of the transform sub-block 610 may be specified.

Enable information signaling (S1410), application information signaling (S1420), division direction information signaling (S1450), residual sample rearrangement (S1460), a sub-block transform (S1420), and an entire block transform (S1480) may be performed in the same way as in Embodiment 1.

The video decoding apparatus may identify the transform sub-block 610 in the current block 600 using the division type information and the division direction information included in the sub-block information (S1520), and derive residual samples (a residual block) in the transform sub-block 610 by inversely transforming transform coefficients in the transform sub-block 610 according to a transform type indicated by transform type information (S1530).

Decoding of the transform coefficients, the transform type information, and the sub-block information (S1510), residual sample rearrangement (S1550), reconstructed block derivation (S1560), etc. may be performed in the same way as in Embodiment 1.

As an example of Embodiment 2, when residual samples having non-zero values are distributed to a right quarter region of the current block 600 (when the transform sub-block is in a right quarter region of the current block), enable information and application information may be set to "1," division type information (sbt_binary_flag) may be set to "0" which means the quad division type, division direction information (sbt_direction) may be set to "0" which means the vertical direction, and rearrangement information (sbt_shifting) may be set to "1."

As a result, the residual samples having non-zero values in the right quarter region of the current block 600 (see (B) of FIG. 7) may be rearranged in a left quarter region of the current block 600 as shown in (A) of FIG. 7.

According to embodiments, the process S1550 of rearranging the residual samples may be performed as indicated by the rearrangement information signaled by the video encoding apparatus.

The video encoding apparatus may further signal rearrangement information indicating whether residual samples have been rearranged (S1460). When the signaled rearrangement information indicates rearrangement (S1540), the video decoding apparatus may rearrange residual samples on the basis of the division direction indicated by the division direction information (S1550). Unlike this, when the rearrangement information indicates that residual samples have not been rearranged (S1540), the video decoding apparatus may derive a reconstructed block on the basis of the derived residual samples without performing the rearrangement process (S1560).

Embodiment 3

Embodiment 3 corresponds to a method of rearranging residual samples by transmitting position information of one region (a transform sub-block) among a total of four regions in the case of the quad division type shown in FIG. 7.

Figure 17:
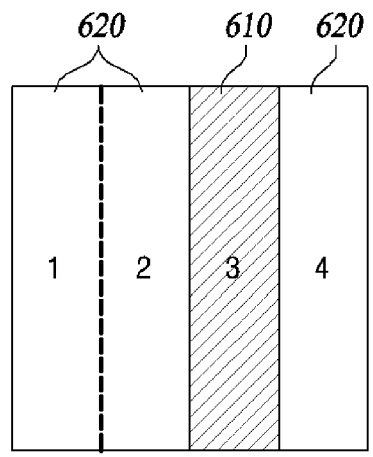
Figure 17:
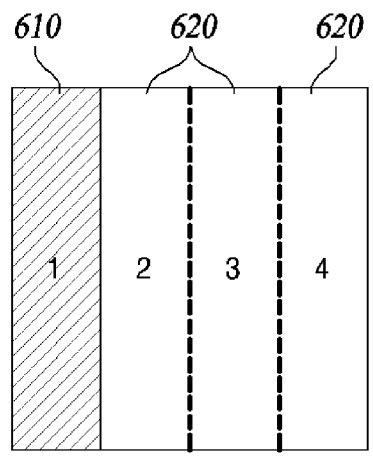

Position information is information specifying the position of the transform sub-block 610 in the current block 600. In other words, position information is information indicating a sub-block (a transform sub-block) having non-zero transform coefficients among sub-blocks 600. An example in which the position information is represented as a 2-bit index is shown in FIG. 17. According to the example shown in FIG. 17, a first quarter region 1, a second quarter region 2, a third quarter region 3, and a fourth quarter region 4 may be represented as "00," "01," "10," and "11," respectively.

When a sub-block transform is applied, the video encoding apparatus may include the position information in sub-block information together with division direction information and signal the sub-block information to the video decoding apparatus. Since the transform sub-block 610 may be specified due to the position information, division type information may not be signaled, and rearrangement information may not be signaled, either.

Enable information signaling, application information signaling, residual sample rearrangement, a sub-block transform, an entire block transform, etc. may be performed in the same way as in Embodiment 1 or Embodiment 2.

The video decoding apparatus may specify the transform sub-block 610 in the current block 600 using the division direction information and the position information and derive residual samples in the transform sub-block 610 by inversely transforming transform coefficients in the specified transform sub-block 610 according to a transform type indicated by transform type information. Also, the video decoding apparatus may rearrange residual samples according to a division direction indicated by division direction information. Decoding of the transform coefficients, the transform type information, and the sub-block transform, reconstructed block derivation, etc. may be performed in the same way as in Embodiment 1 or Embodiment 2.

As an example of Embodiment 3, when residual samples having non-zero values are in the third quarter 3 (when a transform sub-block is the third quarter region) as shown in (A) of FIG. 17, application information is set to "1," division direction information (sbt_direction) may be set to "0" which means the vertical direction, and position information indicating the transform sub-block 610 may be set to "10." As a result, the residual samples in the third quarter region 3 may be rearranged in the first quarter region 1 as shown in (B) of FIG. 17.

Embodiment 4

Embodiment 4 corresponds to a method of rearranging residual samples by transmitting position information of a plurality of regions (transform sub-blocks) among a total of four regions in the case of the quad division type.

Figure 18:
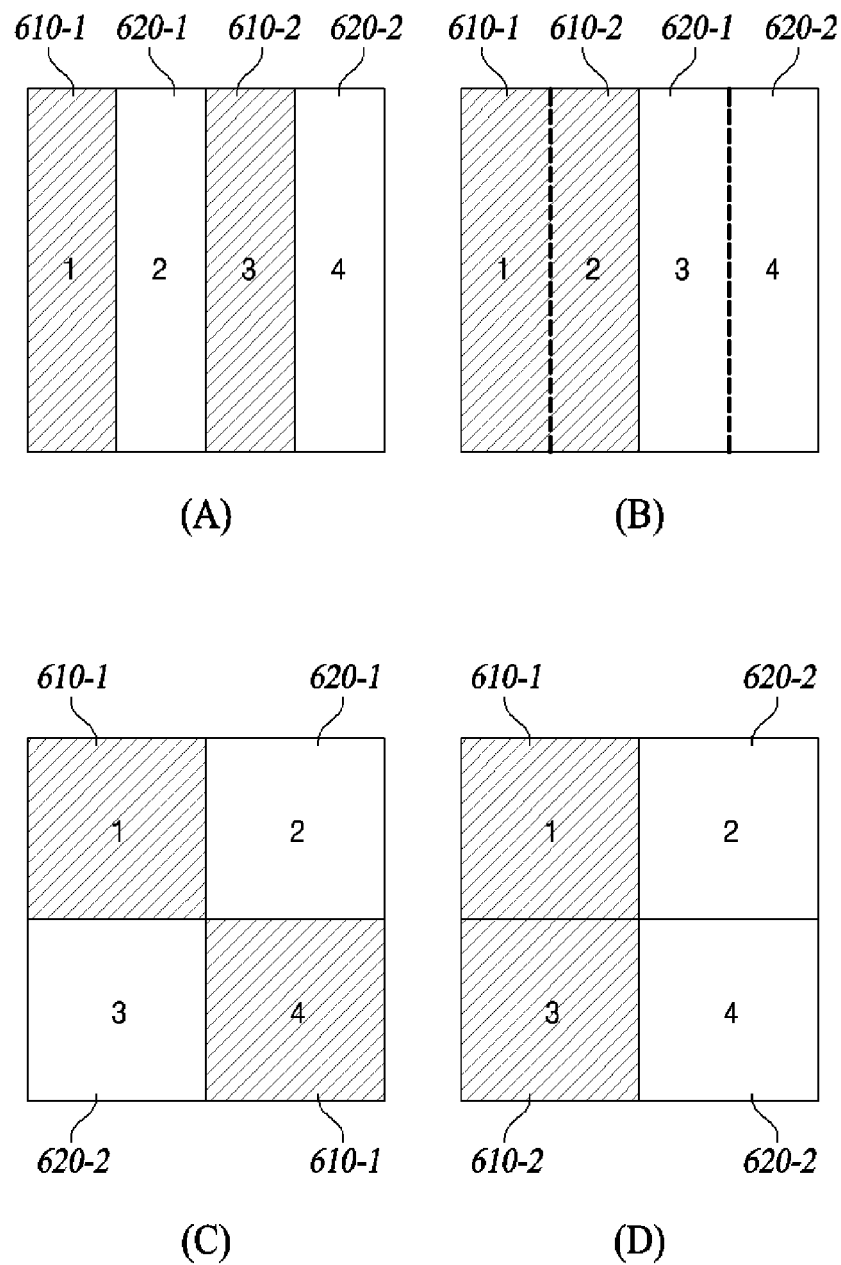

As shown in FIG. 18, the current block 600 may include a plurality of transform sub-blocks 610-1 and 610-2. In this case, the video encoding apparatus may include position information of the plurality of transform sub-blocks 610-1 and 610-2 in sub-block information together with division direction information, and signal the sub-block information to the video decoding apparatus. However, when the sub-blocks 610 and 620 are divided as shown in FIG. 8, division direction information may not be signaled.

In Embodiment 4, position information is information specifying positions of the plurality of sub-blocks 610-1 and 610-2 and may be an index having a total of four bits.

Among the four bits, the first bit represents whether a first quarter region 1 corresponds to the transform sub-block 610, the second bit represents whether a second quarter region 2 corresponds to the transform sub-block 610, the third bit represents whether a third quarter region 3 corresponds to the transform sub-block 610, and the fourth bit represents whether a fourth quarter region 4 corresponds to the transform sub-block 610.

Since the transform sub-blocks 610-1 and 610-2 may be specified due to the position information, division type information may not be signaled, and rearrangement information may not be signaled, either.

The video encoding apparatus may rearrange both or one of the transform sub-blocks 610-1 and 610-2 so that the transform sub-blocks 610-1 and 610-2 are positioned on the left, upper, or upper left side of the current block 600. When rearrangement is completed, the transform sub-blocks 610-1 and 610-2 which have been spaced apart from each other become adjacent to each other. As a result, the transform sub-blocks 610-1 and 610-2 may be treated as a single transform sub-block. Therefore, this process may be understood as grouping the transform sub-blocks 610-1 and 610-2.

The video encoding apparatus may perform a sub-block transform, quantization, filtering, etc. on the grouped transform sub-blocks 610-1 and 610-2. Enable information signaling, application information signaling, residual sample rearrangement, a sub-block transform, an entire block transform, etc. may be performed in the same way as in Embodiments 1 to 3.

The video decoding apparatus may specify the transform sub-blocks 610-1 and 610-2 in the current block 600 using the division direction information and the position information, and derive residual samples in the transform sub-blocks 610-1 and 610-2 by inversely transforming transform coefficients in the specified transform sub-blocks 610-1 and 610-2 according to a transform type indicated by transform type information.

Also, the video decoding apparatus may rearrange residual samples according to a division direction indicated by division direction information. When division direction information is not signaled (the division form of FIG. 8), the video decoding apparatus may rearrange residual samples on the basis of the position information.

Rearrangement may be performed on both or one of the transform sub-blocks 610-1 and 610-2. For example, a transform sub-block located at a position not corresponding to the position information between the transform sub-blocks 610-1 and 610-2 corresponds to a block to which rearrangement has been applied by the video encoding apparatus, and thus rearrangement may be applied to the transform sub-block. Unlike this, a transform sub-block located at a position corresponding to the position information corresponds to a block to which rearrangement has not been applied by the video encoding apparatus, and thus rearrangement may not be applied to the transform sub-block.

Decoding of the transform coefficients, the transform type information, and the sub-block information (S1610), reconstructed block derivation (S1650), etc. may be performed in the same way as in Embodiments 1 to 3.

Examples of Embodiment 4 are shown in FIG. 18.

(A) of FIG. 18 shows the two transform sub-blocks 610-1 and 610-2 which are not adjacent before rearrangement, and (B) of FIG. 18 shows grouped transform sub-blocks 610-1 and 610-2 after rearrangement.

In the examples of (A) and (B) of FIG. 18, enable information and application information may be set to "1," and division direction information (sbt_direction) may be set to "0" which means the vertical direction. Since the transform sub-blocks 610-1 and 610-2 before rearrangement are at the first quarter region 1 and the third quarter region 3, respectively, position information may be set to "1010."

In the examples of (C) and (D) of FIG. 18, enable information and application information may be set to "1." Since the transform sub-blocks 610-1 and 610-2 before rearrangement are at the first quarter region 1 and the fourth quarter region 4 in the Z-scan order, respectively, position information may be set to "1001."

Embodiment 5

Embodiment 5 corresponds to a method of scanning or rearranging only transform coefficients in the transform sub-block 610. A coefficient scanning process means a process of scanning non-zero coefficients in the transform sub-block 610. The scanning process may be performed in the quantizer 145 and the inverse quantizer 420 or another component (a rearrangement unit, not shown).

The video encoding apparatus may perform a process of rearranging residual samples and then a process of transforming and quantizing the transform sub-block 610. Also, the video encoding apparatus may change (rearrange) coefficients in the form of a two-dimensional block into the form of a one-dimensional vector through a coefficient scanning method to encode quantized transform coefficients.

A scanning method proposed by the present invention involves distinguishing between the transform sub-block 610 and the non-transform sub-block 620 and separately applying scanning to the transform sub-block 610 and the non-transform sub-block 620. In other words, the video encoding apparatus does not perform a scanning process on the non-transform sub-block 620 and may perform a scanning process only on the transform sub-block 610. The non-transform sub-block 620 is treated as a region in which quantized transform coefficients are not encoded. This may be understood as setting cu_cbf of the transform sub-block 610 to "1" and setting cu_cbf of the non-transform sub-block 620 to "0." Here, cu_cbf corresponds to information indicating whether coefficient values are all zero or whether there is at least one non-zero coefficient value.

Information related to coefficient scanning performed in the video encoding apparatus may be signaled from the video encoding apparatus to the video decoding apparatus.

The video decoding apparatus may perform coefficient scanning in a reverse order to a scanning order on the basis of the information related to coefficient scanning. Through this process, the coefficients (quantized transform coefficients) represented in the form of a one-dimensional vector may be restored (rearranged) in a two-dimensional block.

Like the video encoding apparatus, the video decoding apparatus does not perform a scanning process on the non-transform sub-block 620 and may perform a scanning process only on the transform sub-block 610. Therefore, transform coefficients (quantized transform coefficients) in the transform sub-block 610 may be scanned, and all values in the non-transform sub-block 620 may be filled with zero.

Figure 19:
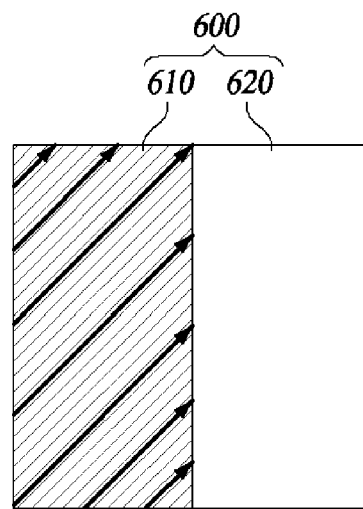
Figure 19:
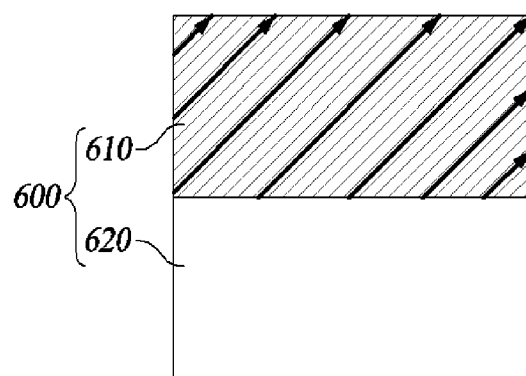

An example of Embodiment 5 is shown in FIG. 19. FIG. 19 shows a diagonal-up scanning method. When the transform sub-block 610 is on the left side of the current block 600 as shown in (A) of FIG. 19, a diagonal-up scanning process (indicated by arrows) may be applied only to the transform sub-block 610. A scanning process may be omitted on the non-transform sub-block 620. When the transform sub-block 610 is on the upper side of the current block 600 as shown in (B) of FIG. 19, a diagonal-up scanning process (indicated by arrows) may be applied only to the transform sub-block 610. A scanning process on the non-transform sub-block 620 may be omitted.

Since the coefficient scanning process means a process of scanning non-zero coefficients in the transform sub-block 610, syntaxes for non-zero coefficients in a region to be scanned (the transform sub-block) should be signaled. For example, syntaxes indicating the position of the last non-zero coefficient in the transform sub-block 610 are signaled, and a syntax indicating whether a 4×4 sub-block has at least one non-zero coefficient is respectively signaled for 4×4 sub-blocks from a top leftmost 4×4 sub-block to a 4×4 sub-block in which the last non-zero coefficient is present. The syntax indicating whether a 4×4 sub-block has at least one non-zero coefficient may not be encoded for the top leftmost 4×4 sub-block and the 4×4 sub-block in which the last non-zero coefficient is present (syntaxes indicating whether the 4×4 sub-block in which the last non-zero coefficient is present has at least one non-zero coefficient and whether the top leftmost 4×4 sub-block has at least one non-zero coefficient may not be signaled). Here, a 4×4 sub-block unit syntax for non-zero coefficients in a region not to be scanned (the non-transform sub-block) is not signaled.

For example, a scanning process may be applied to the 4×4 sub-blocks from the top leftmost 4×4 sub-block to the 4×4 sub-block in which the last non-zero coefficient is present, in a scanning order illustrated in FIG. 19, and syntaxes indicating non-zero coefficients may be signaled. Alternatively, a scanning process may be applied to to the 4×4 sub-blocks from the 4×4 sub-block in which the last non-zero coefficient is present to the top leftmost 4×4 sub-block in a reverse order to the scanning order illustrated in FIG. 19, and syntaxes indicating non-zero coefficients may be signaled.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A video decoding apparatus for decoding a current block of video data, the apparatus comprising:
a decoder configured to decode transform coefficients corresponding to only part of sub-blocks in the current block, and sub-block information indicating a division form of the sub-blocks from a bitstream;
an inverse transformer configured to derive a residual block of the current block from the transform coefficients on the basis of the sub-block information; and
a filtering unit configured to filter boundaries of the sub-blocks in a reconstructed block of the current block derived on the basis of the residual block,
wherein the sub-block information includes:
division direction information indicating a division direction of the sub-blocks; and
at least one of division type information indicating a division type of the sub-blocks between a binary division type and a quad division type and position information indicating a position of at least one transform sub-block which is a transformed region among the sub-blocks,
wherein the inverse transformer is further configured to:
identify the transform sub-block and at least one non-transform sub-block which is a region not transformed, on the basis of the sub-block information; and
derive residual samples corresponding to the transform sub-block, by inversely transforming the transform coefficients in the transform sub-block, and
set residual samples corresponding to the non-transform sub-block as zero.

2. The apparatus of claim 1, wherein the decoder is further configured to:
decode application information when enable information included in the bitstream indicates that a sub-block transform is allowed; and
decode the sub-block information when the application information indicates that the sub-block transform is applied to the current block.

3. The apparatus of claim 1, wherein the filtering unit is further configured to filter the boundary between the transform sub-block and the non-transform sub-block.

4. A method for encoding a current block of video data, the method comprising:
encoding, into a bitstream, transform coefficients corresponding to only part of sub-blocks in the current block, and sub-block information indicating a division form of the sub-blocks, wherein the transform coefficients are generated by transforming residual signals that are differences between pixels in the current block and predicted pixels thereof;
deriving a residual block of the current block from the transform coefficients on the basis of the sub-block information; and
filtering boundaries of the sub-blocks in a reconstructed block of the current block derived on the basis of the residual block,
wherein the sub-block information includes:
division direction information indicating a division direction of the sub-blocks; and
at least one of division type information indicating a division type of the sub-blocks between a binary division type and a quad division type and position information indicating a position of at least one transform sub-block which is a transformed region among the sub-blocks,
wherein the deriving of the residual block includes:
identifying the transform sub-block and at least one non-transform sub-block which is a region not transformed, on the basis of the sub-block information;
deriving residual samples corresponding to the transform sub-block, by inversely transforming the transform coefficients in the transform sub-block; and
setting residual samples corresponding to the non-transform sub-block as zero.

5. The method of claim 4, further comprising:
encode enable information indicating whether a sub-block transform is allowed,
encode application information when the enable information indicates that the sub-block transform is allowed, and
encode the sub-block information when the application information indicates that the sub-block transform is applied to the current block.

6. The method of claim 4, wherein the filtering of boundaries of the sub-blocks comprises filtering the boundary between the transform sub-block and the non-transform sub-block.

7. A method for providing a video decoding apparatus with video data, the method comprising:
encoding the video data into a bitstream; and
transmitting the bitstream to the video decoding apparatus,
wherein the encoding of the video data includes:
encoding, into the bitstream, transform coefficients corresponding to only part of sub-blocks in a current block of the video data, and sub-block information indicating a division form of the sub-blocks, wherein the transform coefficients are generated by transforming residual signals that are differences between pixels in the current block and predicted pixels thereof;
deriving a residual block of the current block from the transform coefficients on the basis of the sub-block information; and
filtering boundaries of the sub-blocks in a reconstructed block of the current block derived on the basis of the residual block,
wherein the sub-block information includes:
division direction information indicating a division direction of the sub-blocks; and
at least one of division type information indicating a division type of the sub-blocks between a binary division type and a quad division type and position information indicating a position of at least one transform sub-block which is a transformed region among the sub-blocks,
wherein the deriving of the residual block of the current block includes:
identifying the transform sub-block and at least one non-transform sub-block which is a region not transformed, on the basis of the sub-block information;
deriving residual samples corresponding to the transform sub-block, by inversely transforming the transform coefficients in the transform sub-block; and setting residual samples corresponding to the non-transform sub-block as zero.

* * * * *